United States Patent
Plantan

[11] 3,947,072
[45] Mar. 30, 1976

[54] BRAKE SYSTEM

[75] Inventor: Ronald S. Plantan, Wickliffe, Ohio

[73] Assignee: White Motor Corporation, Cleveland, Ohio

[22] Filed: Nov. 25, 1974

[21] Appl. No.: 526,478

[52] U.S. Cl. .................................. 303/13; 303/9
[51] Int. Cl.² ...................................... B60T 13/36
[58] Field of Search ............ 303/2, 7, 9, 13, 63, 70, 303/80

[56] References Cited
UNITED STATES PATENTS

| | | | |
|---|---|---|---|
| 3,272,564 | 9/1966 | Romanini | 303/7 |
| 3,294,455 | 12/1966 | Valentine | 303/9 |
| 3,410,610 | 11/1968 | Cumming | 303/9 |
| 3,672,729 | 6/1972 | Blakey | 303/2 X |
| 3,713,702 | 1/1973 | Campanini | 303/2 X |

Primary Examiner—Duane A. Reger
Attorney, Agent, or Firm—Watts, Hoffmann, Fisher & Heinke Co.

[57] ABSTRACT

A brake system includes separate service and emergency brake actuators. The service brake actuators are normally disengaged, and engage when supplied with pressurized fluid. The emergency brake actuators are disengaged when supplied with pressurized fluid and engage in the absence of fluid pressurization. A restricted orifice limits the rate at which pressurized fluid can be supplied to the emergency brake system. Fluid is tapped from the emergency brake system to effect service brake application. The flow of tapped fluid from the emergency brake system is regulated by an operator control to effect a controlled application of the service brake actuators. In the event of a failure in the conduit receiving tapped fluid from the emergency brake system the discharge of tapped fluid from the emergency brake actuators into the failed conduit is regulated by the operator control to effect a smooth, controlled application of the emergency brake system.

29 Claims, 5 Drawing Figures

BRAKE SYSTEM

BACKGROUND OF THE INVENTION

1. Field of the Invention

The present invention relates to fluid-operated brake systems of the type including service and emergency brake actuators, and more particularly to a brake system including a valve for effecting a controlled application of the emergency brake actuators in the event of a failure in the service brake control system.

2. Prior Art

Tractor-trailer brake systems are known which include trailer brakes having tandem service and emergency brake chambers. Separate service and emergency brake conduits communicate respectively with the service and emergency brake chambers.

Service brake application or engagement is effected by supplying pressurized fluid to the service brake chambers through the service brake conduit. Service brake disengagement is effected by venting the service brake conduit to atmosphere to exhaust the service brake chambers. The force of service brake application is proportional to the pressure of the fluid in the service brake chambers.

Emergency brake application or engagement is effected by exhausting the emergency brake chambers to atmosphere through the emergency brake conduit to permit braking members to be spring biased into engagement. Emergency brake disengagement is effected by supplying pressurized fluid through the emergency brake conduit to the emergency brake chambers to overcome the spring bias and disengage the braking members.

The emergency brakes are normally held off, i.e., disengaged, when the vehicle is in operation. When the movement of the vehicle is to be braked, pressurized fluid is supplied to the service brake chambers by a control system which communicates with the service brake conduit. When the vehicle is to be parked, the emergency brake conduit is vented to atmosphere, bringing the emergency brakes into full braking engagement.

Proposals have been made in an effort to bring the emergency brake system into operation if a failure should occur in the service brake system. A problem with most such proposals has been that if the vehicle is moving when the emergency brakes are brought rapidly and fully into play, the emergency-braked wheels may skid with a resulting loss in vehicle control.

A number of proposals have been made in an effort to provide controlled, modulated operation of the emergency brakes in the event of a failure in the service brake system. Such proposals have resulted in complex and expensive multi-valve systems that are sluggish in responding to a control signal, lacking in reliability, and do not effect a desirably smooth, controlled application of the emergency brakes.

SUMMARY OF THE INVENTION

The present invention overcomes the foregoing and other drawbacks of the prior art by providing a brake system with a control valve of relatively simple construction which is operative normally to effect modulated service brake application, and which is operative in the event of service brake failure to provide a smooth, responsive, controlled emergency brake application.

Separate service and emergency brake chambers are provided which communicate respectively with separate service and emergency brake conduits. The emergency brake conduit is connected to a source of pressurized fluid and the conduit includes a restrictive orifice. The orifice limits the rate at which pressurized fluid can be supplied through the emergency brake conduit. The emergency brake conduit communicates with a reservoir which normally contains a quantity of fluid which has been supplied through the emergency brake conduit and its orifice. When a predetermined pressure has been established in the reservoir and in the emergency brake chambers, the emergency brakes will fully disengage.

A foot-operated control is provided at a position which is accessible by an operator. The foot-operated control communicates with the pressurized fluid source. When the foot-operated control is depressed, a fluid pressure output signal is provided having a pressure magnitude which indicates the desired degree of brake application.

A protection valve receives the fluid pressure signal from the foot-operated control. The protection valve serves the dual functions of effecting normal service brake application, and of effecting a controlled, modulated emergency brake application in the event of service brake failure.

The protection valve responds to the fluid pressure signal from the foot-operated control by communicating a signal conduit with the emergency brake conduit to transfer pressurized fluid from the emergency brake conduit to the signal conduit. The signal conduit connects with a relay valve. When the signal conduit is pressurized by fluid flowing through the protection valve, the relay valve communicates the service brake conduit with the reservoir to apply the service brakes.

If the signal conduit fails, the relay valve receives no signal to effect service brake application. In this situation, the protection valve discharges fluid from the emergency brake conduit at a rate dependent on the degree of foot control depression to exhaust the emergency brake chambers and effect a controlled emergency brake application.

The degree to which the emergency brake application is effected is controlled by the protection valve as a function of the degree to which the foot-operated control is depressed. Full depression of the foot-operated control will cause the protection valve to rapidly exhaust the emergency brake system and rapidly effect emergency brake application. A lesser depression of the foot-operated control will effect a corresponding lighter emergency brake application. If the foot-operated control is released, the protection valve will cease to exhaust the emergency brake system and the emergency brake system will be repressurized by air supplied through the orifice.

A significant feature of brake systems constructed in accordance with the present invention is the advantageous rate at which the emergency brakes are brought into play when the foot-operated control is fully depressed. Fluid from the emergency brake system is initially rapidly exhausted by the protection valve to initiate emergency brake application. Once the emergency brake application has begun, the fluid which enters the emergency brake system through the orifice significantly slows the rate at which the emergency brake system is exhausted by the protection valve. This slowing of the exhaustion rate provides a smoother and more efficient emergency brake application than would occur if the emergency brake system were simply rapidly and fully exhausted.

The preferred valve embodiment includes two signal responsive pistons. One of the pistons (1) selectively communicates the signal conduit with the atmosphere and with the emergency brake conduit, and (2) controls the flow of air between the emergency brake conduit and the signal conduit during normal service brake application. The other piston assists in regulating the discharge of air through the valve from the emergency brake conduit into the signal conduit when a failure has occurred in the signal conduit.

An alternate valve embodiment utilizes a single piston to effect the functions provided by two pistons in the preferred valve embodiment.

In the description which follows, the invention is applied to a tractor-trailer brake system where both brake control and brake operation is pneumatically effected, and where the trailer emergency brake actuators are spring brake actuators which are to be modulated in the event of trailer service brake failure. The invention can be applied to emergency brake systems in other types of vehicles, to brake systems which are controlled by signals other than pneumatic signals, and to brake systems where the emergency brakes are operated by fluids other than pressurized air.

When the present invention is applied to tractor-trailer brake systems, a number of other advantages obtained over prior tractor-trailer brake systems. By way of one example, prior tractor protection valves have been plumbed to supply fluid pressure to the trailer from relatively large diameter conduits communicating with the foot-operated valve. The present invention obviates the need for these large diameter supply conduits and permits their replacement with small diameter signal conduits that need only carry enough fluid to provide a signal to the protection valve.

It is a general object of the present invention to provide a novel and improved brake system.

Other objects and a fuller understanding of the invention may be had by referring to the following description and claims taken in conjunction with the accompanying drawings.

DESCRIPTION OF THE PREFERRED EMBODIMENT

Figure 1:
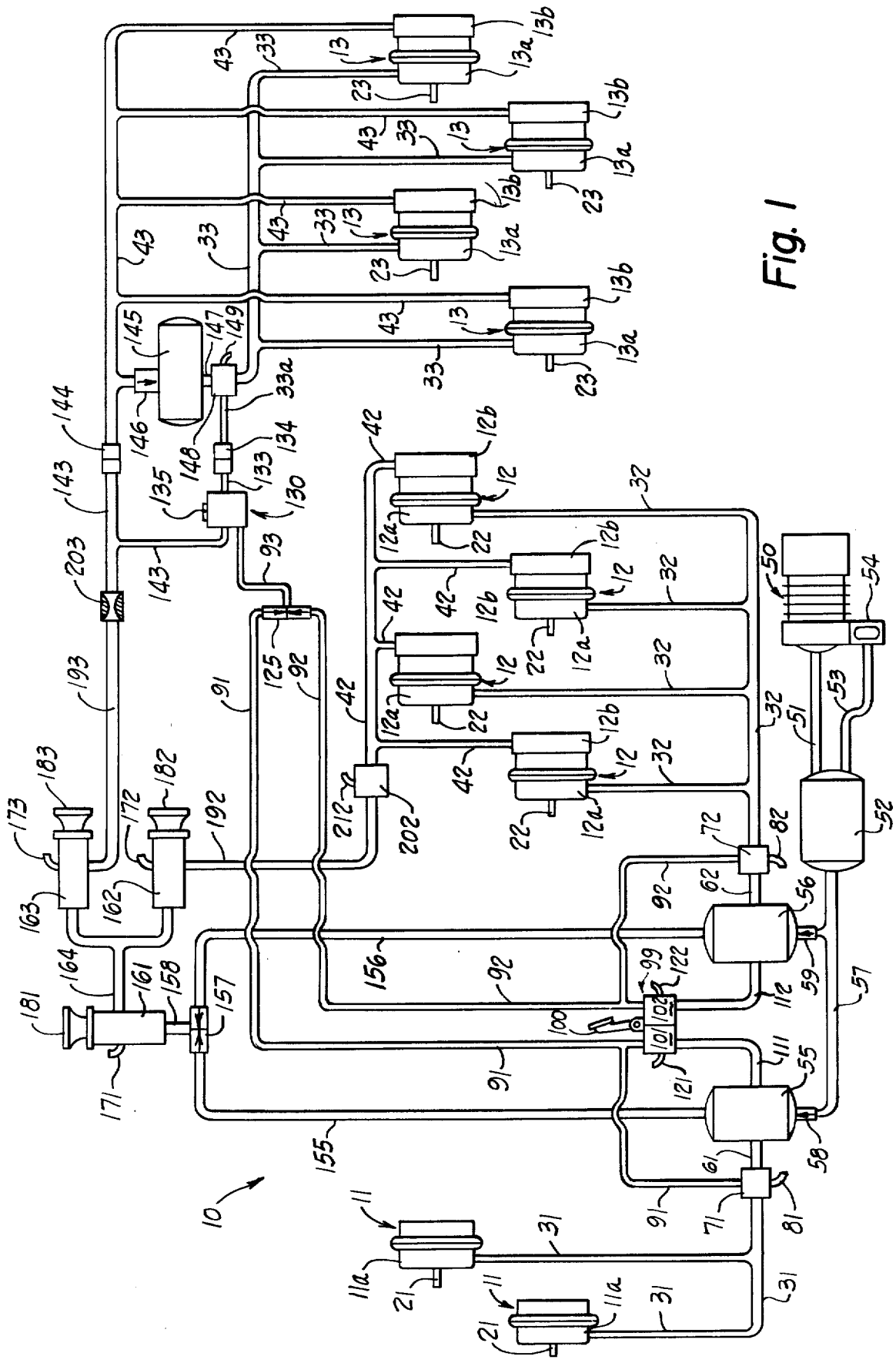
FIG. 1 is a schematic view of a tractor-trailer brake system embodying the present invention.

Referring to FIG. 1, a tractor-trailer brake system is shown generally at 10. The brake system 10 includes two tractor front wheel brake actuators 11, four tractor rear wheel brake actuators 12, and four trailer wheel brake actuators 13.

The front wheel brake actuators 11 are conventional pneumatic brake actuators having service chambers 11a and having extensible push rods 21. A conduit 31 communicates with the service brake chambers 11a. When pressurized air is supplied by the conduit 31 to the service brakes chambers 11a, the push rods 21 extend to effect braking of the tractor front wheels (not shown). When air is exhausted from the conduit 31, the push rods 21 retract to release the brake actuators 11.

The rear wheel brake actuators 12 and the trailer wheel brake actuators 13 are conventional pneumatic brake actuators having tandem service and spring brake chambers 12a, 13a, and 12b, 13b. The brake actuators 12, 13 have extensible push rods 22, 23. Service brake conduits 32, 33 communicate with service brake chambers 12a, 13a. Spring brake conduits 42, 43 communicate with spring brake chambers 12b, 13b.

During normal vehicle operation, pressurized air is supplied through the conduits 42, 43 to the spring brake chambers 12b, 13b to effect spring brake release. When air is exhausted from the spring brake chambers 12b, 13b, the spring brake actuators are operative to effect extension of the push rods 22, 23 to brake the rear tractor and trailer wheels (not shown).

During normal vehicle operation, the service brake chambers 12a, 13a are operative when pressurized by air supplied from the conduits 32, 33 to extend the push rods 22, 23 and apply the brake actuators 12, 13. When air is exhausted from the service chambers 12a, 13a, the push rods 22, 23 retract.

Pressurized air is supplied to the brake system 10 by a compressor 50. A supply conduit 51 receives pressurized air from the compressor 50. A primary reservoir 52 receives pressurized air from the supply conduit 51. A return conduit 53 communicates with the reservoir 52. A governor 54 communicates with the conduit 53 and with the air compressor 50. When the pressure in the primary reservoir 52 reaches a predetermined magnitude, the governor 54 permits pressurized air to circulate through the conduits 51, 53 between the reservoir 52 and the governor 54 to prevent a further increase in pressure in the reservoir 52.

Two secondary reservoirs 55, 56 are supplied with pressurized air from the primary reservoir 52. A supply conduit 57 receives pressurized air from the primary reservoir 52. A pair of check valves 58, 59 communicate with the conduit 57 and the reservoirs 55, 56. The check valves 58, 59 permit the flow of pressurized air into the reservoirs 55, 56 from the conduit 57 and prohibit reverse flow.

The front wheel brake actuators 11 receive pressurized air from the reservoir 55. A supply conduit 61 communicates with the reservoir 55. A relay valve 71 communicates with the supply conduit 61. A vent conduit 81, a signal conduit 91, and the supply conduit 31 also communicate with the relay valve 71. The relay valve 71 is operable to selectively communicate the supply conduit 31 with the supply conduit 61 and the vent conduit 81. When air pressure in the signal conduit 91 falls below a predetermined level, the relay valve 71 communicates the supply conduit 31 with the vent conduit 81, exhausting the supply conduit 31 to atmosphere. When air pressure in the signal conduit 91 is above a predetermined level, the relay valve 71 communicates the supply conduits 31, 61 and supplies pressurized air to the conduit 31 in proportion to the pressure of the air in the signal conduit 91.

The rear wheel brake actuators 12 receive pressurized air from the reservoir 56. A supply conduit 62 communicates with the reservoir 56. A relay valve 72 communicates with the supply conduit 62. A vent conduit 82, a signal conduit 92, and the supply conduit 32 also communicate with the relay valve 72. The relay valve 72 is operable to selectively communicate the supply conduit 32 with the supply conduit 62 and the vent conduit 82. When air pressure in the signal conduit 92 falls below a predetermined level, the relay valve 72 communicates the supply conduit 32 with the vent conduit 82, exhausting the supply conduit 32 to atmosphere. When air pressure in the signal conduit 92 is above a predetermined level, the relay valve 72 communicates the supply conduits 32, 62 and supplies pressurized air to the conduit 32 in proportion to the pressure of the air in the signal conduit 92.

A foot-operated valve assembly 99 includes a foot-operated lever 100 which concurrently operates a pair of side-by-side valves 101, 102. The lever 100 is positioned in the tractor cab (not shown) for ready access by an operator.

A pair of supply conduits 111, 112, a pair of vent conduits 121, 122, and the signal conduits 91, 92 communicate with the valves 101, 102. The supply conduits 111, 112 connect respectively with the reservoirs 55, 56 and supply pressurized air to the valves 101, 102. When the foot-operated lever 100 is depressed by an operator, the valve 101 communicates the conduits 91, 111, and the valve 102 communicates the conduits 92, 112, to supply pressurized air to the signal conduits 91, 92 in proportion to the extent of foot-lever depression. When the foot-operated lever 100 is in its normal, nondepressed position, the valves 101, 102 communicate the signal conduits 91, 92 with the vent conduits 121, 122, exhausting the signal conduits 91, 92 to atmosphere.

The signal conduits 91, 92 have branches which extend into communication with a conventional double check valve 125. A signal conduit 93 communicates with the check valve 125. The check valve 125 is operative to permit the flow of pressurized air from the signal conduits 91, 92 to the signal conduit 93 and to prevent reverse flow. In the event that the air pressure in one of the conduits 91, 92 is higher than the other of the conduits 91, 92, the check valve 125 will communicate only the higher pressurized one of the conduits 91, 92 with the signal conduit 93.

A tractor protection valve 130 communicates with the signal conduit 130. A pair of conduits 133, 143 also communicate with the tractor protection valve 130. A vent port 135 is formed in the tractor protection valve 130. As will be explained in greater detail, the tractor protection valve 130 is operative to selectively communicate the conduit 133 with the conduit 143 and the vent port 135. When air pressure in the signal conduit 93 is below a predetermined level, the valve 130 communicates the conduit 133 with the vent port 135, venting the conduit 133 to atmosphere. When air pressure in the signal conduit 93 exceeds a predetermined level, the valve 130 communicates the conduits 133, 143 and supplies pressurized air from the conduit 143 to the conduit 133 in proportion to the pressure in the signal conduit 93.

A pair of conventional quick-disconnect pneumatic connectors 134, 144 are provided to releasably connect the tractor and trailer-carried portions of the brake system 10. The connector 134 communicates the tractor-carried conduit 133 with a trailer-carried conduit 33a. The connector 144 communicates the tractor-carried conduit 143 with the trailer-carried conduit 43. The connectors 134, 144 provide a means for connecting and disconnecting the conduits 133, 33a and 143, 43 when the tractor and trailer are connected and disconnected.

The trailer-carried portion of the brake system 10 includes a reservoir tank 145. A check valve 146 permits the flow of air from the conduit 43 into the reservoir 145 and prevents reverse flow.

The trailer service brake chambers 13a receive pressurized air from the reservoir 145. A supply conduit 147 communicates with the reservoir 145. A relay valve 148 communicates with the supply conduit 147. A vent conduit 149, the signal conduit 33a, and the service brake conduit 33 also communicate with the relay valve 148. The relay valve 148 is operable to selectively communicate the service brake conduit 33 with the supply conduit 147 and the vent conduit 149. When air pressure in the signal conduit 33a falls below a predetermined level, the relay valve 148 communicates the service brake conduit 33 with the vent conduit 149, exhausting the service brake conduit 33 to atmosphere. When air pressure in the signal conduit 33a is above a predetermined level, the relay valve 148 communicates the service brake conduit 33 with the supply conduit 147 and supplies pressurized air to the conduit 33 in proportion to the pressure of the air in the signal conduit 33a.

Returning to the tractor-carried portion of the brake system 10, a pair of supply conduits 155, 156 communicate respectively with the reservoirs 55, 56. A conventional double check valve 157 communicates with the supply conduits 155, 156, and with a supply conduit 158. The check valve 157 is operative to permit the flow of pressurized air from the supply conduits 155, 156 to the supply conduit 158 to prevent reverse flow. In the event that the air pressure in one of the conduits 155, 156 is higher than in the other of the conduits 155, 156, the check valve 157 will communicate only the higher pressurized one of the conduits 155, 156 with the supply conduit 158.

Three conventional push-pull control valves 161, 162, 163 are carried in the tractor cab (not shown). A conduit 164 interconnects the valves 161, 162, 163. The valves 161, 162, 163 communicate with vent conduits 171, 172, 173 and have push-pull knobs 181, 182, 183. A pair of conduits 192, 193 communicate respectively with the valves 162, 163.

The valve 161 is operative to selectively communicate the conduit 164 with the supply conduit 158 and with the vent conduit 171. When the knob 181 is pushed to its inward position, the valve 161 communicates the conduits 158, 164. When the knob 181 is pulled to its outward or "popped" position, the valve 161 communicates the conduits 164, 171, venting the conduit 164 to atmosphere.

The valve 162 is operative to selectively communicate the conduit 192 with the conduit 164 and with the vent conduit 172. When the knob 182 is pushed to its inward position, the valve 162 communicates the conduits 192, 164. When the knob 182 is pulled to its outward or "popped" position, the valve 162 communicates the conduits 192, 172, venting the conduit 192 to atmosphere.

The valve 163 is operative to selectively communicate the conduit 193 with the conduit 164 and with the vent conduit 173. When the knob 183 is pushed to its inward position, the valve 163 communicates the conduits 193, 164. When the knob 183 is pulled to its outward or "popped" position, the valve 163 communicates the conduits 193, 173, venting the conduit 193 to atmosphere.

A quick release valve 202 communicates with the conduits 192, 42, and with a vent conduit 212. When the pressure in the conduit 192 exceeds a predetermined level, the quick release valve communicates the conduits 192, 42. When the pressure in the conduit 192 drops below a predetermined level, the quick release valve 202 communicates the conduits 42, 212 venting the conduit 42 to atmosphere.

A restricted orifice, indicated schematically by the numeral 203, communicates the conduits 193, 143. The orifice 203 supplies pressurized air from the conduit 193 to the conduit 143, but restricts the rate at which air can flow between the conduits 193, 143, as will be explained.

In operation, when the tractor engine (not shown) is started, the air compressor 50 begins charging the reservoirs 52, 55, 56. As soon as the reservoirs 55, 56 are pressurized, the foot-operated valve 99 is operative to control the front wheel service brake actuators 11. The rear wheel brake actuators 12 and the trailer brake actuators 13 are not yet released inasmuch as the spring brake chambers 12b, 13b are still exhausted.

The spring brake chambers 12b are pressurized to release the rear wheel brake actuators 12 by pushing in the control knobs 181, 182 to communicate the conduits 158, 164, 192. As pressure rises in the conduit 192, the quick release valve 202 communicates the conduits 192, 42 to pressurize the spring brake chambers 12b. Once the spring brake chambers 12b are pressurized, the foot-operated valve 99 is operative to control the rear wheel brake actuators 12.

The spring brake chambers 13b are pressurized to release the trailer brake actuators 13 by pushing in the control knob 183 to communicate the conduits 164, 193. As pressure rises in the conduit 193, the orifice 203 supplies pressurized air to the conduits 143, 43, to the reservoir 145, and to the spring brake chambers 13b. Once the spring brake chambers 13b are pressurized, the foot-operated valve 99 is operative through the tractor protection valve 130 and the relay valve 148 to control the operation of the trailer brake actuators 13.

When the foot-operated valve lever 100 is depressed to apply the brake actuators 11, 12, 13 the tractor protection valve communicates the conduits 143, 133 and supplies signal pressure to the relay valve 148. The relay valve 148, in turn, communicates the conduits 147, 33 supplying pressurized air to the service brake chambers 13a in proportion to the extent of foot pedal depression.

The orifice 203 is selected to have a restrictive opening of such size as will permit the pressure in the conduits 143, 43 and in the reservoir 145 to drop initially during service brake application of the trailer brake actuators 13. The orifice 203 is of sufficiently large size to prevent the pressure in the conduits 143, 43 and in the reservoir 145 from dropping below a level that will effect spring brake engagement of the trailer brake actuators 13 during service brake engagement of the trailer brakes.

The effect of reducing the pressure in the conduits 143, 43 and in the reservoir 145 during service brake application of the trailer brake actuators 13 is advantageous as it permits a more rapid spring brake application of the trailer brake actuators 13, should that be necessary. Spring brake application of the trailer brake actuators 13 does not come into play until the pressure in the conduits 43, 143 has been significantly reduced. If the trailer service brakes are operating normally, the pressure in the trailer spring brake system will not be sufficiently reduced by trailer service brake operation to engage the trailer spring brakes.

The valve 162 provides an operator control for effecting spring brake application of the tractor rear wheel brake actuators 12. When the knob 182 of the valve 162 is pulled out to its "popped" position, the conduit 192 is vented to atmosphere. As pressure falls in the conduit 192, the quick release valve 202 vents the conduit 42 to atmosphere, exhausting the spring brake chambers 12b.

The valve 163 provides an operator control for effecting spring brake application of the trailer brake actuators 13. When the knob 183 of the valve 163 is pulled out to its "popped" position, the conduit 193 is vented to atmosphere. As pressure falls in the conduit 193, air exhausts through the orifice 203 from the conduits 143, 43 exhausting the spring brake chambers 13b.

In the event of a failure in the conduits 133, 33a or in the connector 134, the tractor protection valve 130 is operative to permit a modulated depressurization of the trailer spring brake chambers 13b as controlled by the foot-operated valve 99. During such a failure, the tractor protection valve 130 is operative to exhaust the conduits 43, 143 and the reservoir 145 into the conduit 133 in a controlled manner to operate the trailer spring brakes in a modulated fashion under the control of the foot-operated valve 99.

Figure 2:
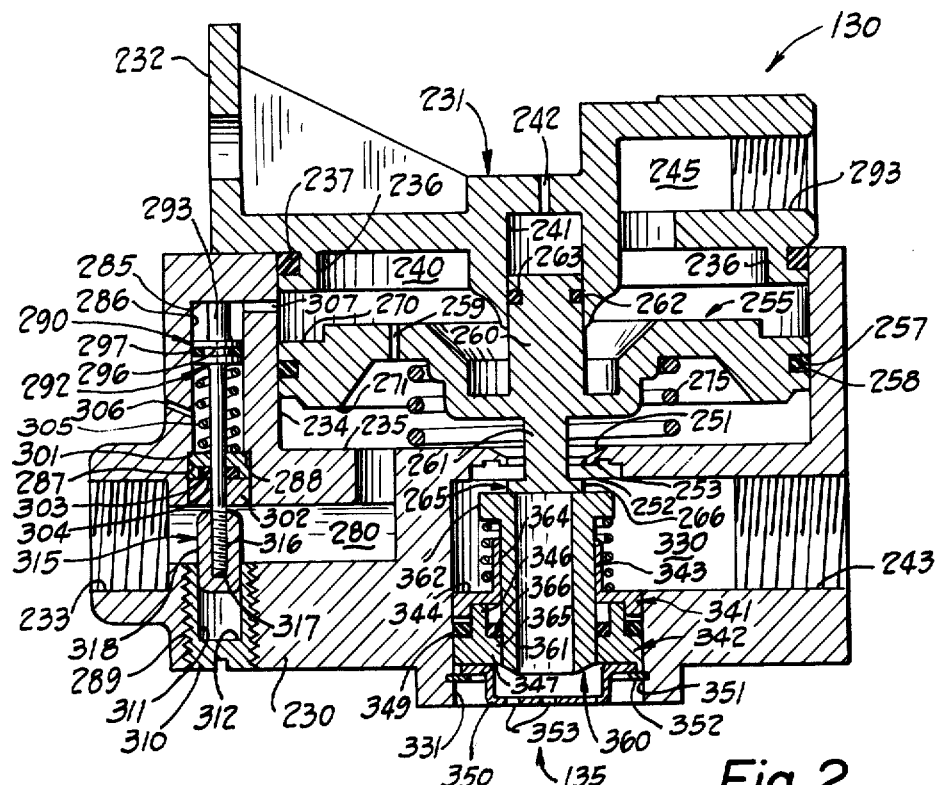
FIGS. 2 and 3 are cross-sectional views of the preferred embodiment of a valve used in the system of FIG. 1, the valve components in FIG. 2 being positioned as occurs when a low pressure signal is received by the valve, the valve components in FIG. 3 being positioned as occurs when a higher pressure signal is received by the valve; and, FIGS. 4 and 5 are cross-sectional views of an alternate valve embodiment, the valve components in FIG. 4 being positioned as occurs when a relatively low pressure signal is received by the valve, the valve components in FIG. 5 being positioned as occurs when a higher pressure signal is received by the valve.
Figure 3:
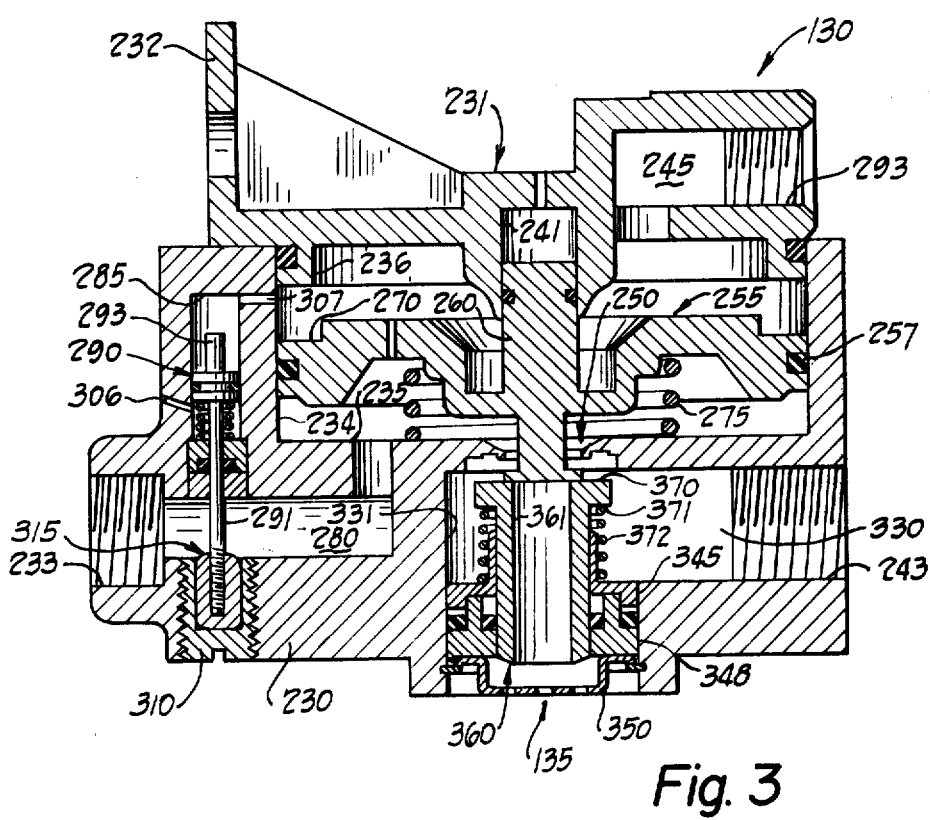

The preferred embodiment of the tractor protection valve 130 is shown in FIGS. 2 and 3. The valve 130 includes a housing 230 and a cover 231. The housing 230 and the cover 231 are secured together by threaded fasteners (not shown). A valve mounting flange 232 is provided on the cover 231.

The housing 230 is a cast metal structure having threaded apertures 233, 243 formed in opposite sides to respectively receive the conduits 133, 143. The cover 231 is a cast metal structure having a threaded aperture 293 to receive the signal conduit 93.

The housing 230 and the cover 231 cooperate to define a cylindrical chamber 240. An upstanding cylindrical wall 234 is formed within the housing 230 and defines the sides of the chamber 240. A circular bottom wall 235 is formed in the housing 230 and defines the lower end of the chamber 240. The cover 231 extends across and closes the upper end of the chamber 240.

An annular flange 236 is formed on the cover 231. The flange 236 extends into the upper end region of the chamber 240 in close proximity to the side wall 234. A peripheral groove 237 is formed in the flange 236. A resilient seal 238 is carried in the groove 237 and perimetrically seals the annular space between the flange 236 and the sidewall 234.

An annular projection 240 is formed on the cover 231. The projection 240 depends centrally into the chamber 240. A cylindrical bore 241 is formed centrally in the projection 240. A vent passage 242 is formed through the cover 231 and vents the upper end region of the bore 241 to the atmosphere.

An L-shaped passage 245 is formed in the cover 231. The passage 245 communicates the threaded aperture 293 and the chamber 240.

A central opening 250 is formed through the housing bottom wall 235. The upper surface of the bottom wall 235 is tapered in the vicinity of the opening 250, as indicated as 251 to provide a smooth funnel-shaped entrance to the opening 250. A cylindrical wall 252 defines the opening 250. An annular machined surface 253 is formed in the housing 230 around the underside of the opening 250.

A piston 255 is movably carried in the chamber 240. The piston 255 has a cylindrical outer wall 256 which slip-fits within the housing inner wall 234. A peripheral groove 257 is formed in the outer wall 256. A resilient seal 258 is carried in the groove 257 and perimetrically seals the annular space between the outer and inner walls 256, 234.

A small diameter hole 259 is formed through the piston to facilitate the eventual balancing of pressures on opposite sides of the piston 255 after the piston has come to rest in the chamber 240. The hole 259 is sufficiently small to have no appreciable effect in diminishing the signal pressure in the region atop the piston 255, and is provided only to eliminate such hysteresis effects as commonly occur in fluid-operated valves of this type.

The piston 255 has a central stem with upwardly and downwardly projecting end regions 260, 261. The upper end region 260 is cylindrical and slidably extends into the bore 241. The bore 241 cooperates with the stem end region 260 to guide the movement of the piston 255 in the chamber 240. A peripheral groove 262 is formed in the stem end region 260. A resilient seal 263 is carried in the groove 262 and perimetrically seals the annular space between the stem end region 260 and the wall of the bore 241.

The lower stem end region 261 has an enlarged diameter foot 265. A cylindrical peripheral wall 266 is formed on the foot 265. The cylindrical wall 266 is of such diameter as will permit the foot 265 to pass through the opening 250 as the piston 255 moves toward the upper end of its range of travel.

An annular recess 270 is formed in the top surface of the piston 255. The piston 255 is at the upper end of its range of travel when the annular cover flange 236 extends into the recess 270 and engages the piston 255.

An annular face 271 is formed on the lower surface of the piston 255. The piston 255 is at the lower end of its range of travel when the annular face 271 engages the housing bottom wall 235.

A compression coil spring 275 biases the piston 255 upwardly. The spring 275 is positioned concentrically around the lower stem end region 261. The upper end of the spring 275 engages the lower surface of the piston 255. The lower end of the spring 275 engages the bottom wall 235.

An L-shaped passage 280 is formed in the housing 230 to communicate the threaded opening 233 and the chamber 260. The passage 280 opens through the bottom wall 235, communicating the region beneath the piston 255 with the threaded opening 233.

A bore 284 is formed in the housing 230. The bore 284 orthogonally intersects the passage 280. The upper end of the bore 284 is closed by a circular wall 285. The upper end region of the bore 284 is defined by a stepped cylindrical side wall having a small diameter region 286 and a larger diameter region 287. A shoulder 288 separates the sidewall regions 286, 287. The lower end region of the bore 284 is threaded, as indicated at 289.

A piston 290 is movably carried in the bore 284. The piston 290 has a small diameter stem 291. An enlarged diameter head 292 is formed near the upper end of the stem 291. A smaller diameter stop projection 293 is formed atop the head 292. The piston 290 is at the upper end of its range of travel when the stop 293 engages the bore end wall 285.

A cylindrical wall 295 is formed on the piston head 295. The wall 295 is slidably received within the bore wall 286. A peripheral groove 296 is formed in the wall 295. A resilient seal 297 is carried in the groove 296 and perimetrically seals the annular space between the walls 295, 296.

A pair of bushings 301, 302 are carried in the bore 284. The bushings 301, 302 have aligned central apertures that slidably journal the piston stem 291. The bushings 301, 302 have outer cylindrical walls which are press-fitted into engagement with the bore wall 287.

The upper bushing 301 has its upper surface in engagement with the shoulder 288. A groove 303 is formed in the lower surface of the bushing 301. A resilient seal 304 is carried in the groove 304 and perimetrically seals the annular space between the piston stem 291 and the bushing 301.

The lower bushing 302 has its upper surface in engagement with the upper bushing 301. The lower surface of the bushing 302 is contiguous with the upper wall of the passage 280.

A compression coil spring 305 biases the piston 290 upwardly. The spring 305 is positioned concentrically around the piston stem 291. The upper end of the spring 305 engages the lower surface of the piston head 292. The lower end of the spring 305 engages the upper surface of the bushing 301.

A vent passage 306 is formed in the housing 230. The passage 306 opens through the bore wall 286 at a position below the piston head 292. The passage 306 vents to the atmosphere the chamber which is occupied by the spring 305.

A passage 307 communicates the bore 284 and the chamber 240. The passage 307 has one end which opens through the bore wall 286 at a position atop the piston head 292. The other end of the passage 307 opens through the housing inner wall 234 at a position just below the cover flange 236.

A plug 310 is threaded into the lower bore region 289. The plug 310 has an upwardly opening central bore 311. A circular bottom wall 312 closes the lower end of the bore 311.

A gate member 315 is carried on the lower end region of the piston stem 291. The lower end region of the piston stem 291 is threaded, as indicated at 316. The gate member 315 has a threaded central bore 317 which is threaded onto the stem end region 316. The gate member 315 has a cylindrical outer wall 318 which slip-fits within the plug bore 311. The piston 290 is at the lower end of its range of travel when the gate member 315 engages the plug bore bottom wall 312.

A passage 330 is formed in the housing 230 to communicate the threaded opening 243 and the opening 250. A bore 331 is formed in the housing 230 and orthogonally intersects the passage 330. The bore 331 extends coaxially with the cylindrical wall 252 which defines the opening 250.

A pair of annular bushings 341, 342 are carried in the bore 331. The upper bushing 341 has an axially extending upper portion 343, and a radially extending lower portion 344. A cylindrical side wall 348 is formed on the lower portion 347. The side wall 348 is slip-fitted in the bore 331. An annular seal 349 is carried radially outwardly of the upper portion 346 at a position between the lower portions 344, 347. The seal 349 perimetrically seals the annular space between the lower bushing 342 and the wall of the bore 331.

A circular cover plate 350 is positioned in the bore 331 at a position below the lower bushing 342. A groove 351 is formed in the wall of the bore 331 below the rim of the cover plate 350. A snap ring 352 is carried in the groove 351 and holds the cover plate 350 in place in the bore 331. A plurality of vent openings 353 are formed through the cover plate 350.

A tubular member 360 is movably carried by the bushings 341, 342. The tubular member 360 has a through bore 361, a large diameter head 362, and a smaller diameter axially extending outer wall 263. The head 362 has radially extending upper and lower surfaces 370, 371.

The bushings 341, 342 have aligned central apertures 364, 365 which slidably journal the outer wall 363. An annular seal 366 is positioned concentrically around the outer wall 363 and perimetrically seals the annular space between the bushing 342 and the tubular member 360.

A compression coil spring 372 biases the tubular member 360 upwardly. The spring 372 is positioned concentrically around the upper portion 343 of the bushing 341. The upper end of the spring 372 engages the lower head surface 371. The lower end of the spring 372 engages the upper surface of the portion 345.

The foot 265 of the piston 255 is engageable with the upper surface 370 of the tubular member 360. When the foot 265 engages the surface 370, the piston foot 265 closes off the upper end of the bore 361.

When the tubular member 360 is at the upper end of its range of travel, the surfaces 370, 253, engage, cutting off communication between the region beneath the piston 255 and the passage 330.

In operation, when the foot-operated lever 100 is not depressed, the air pressure in the signal conduit 93 is minimal and the pressure applied through the passage 245 to the upper surface of the piston 255 is likewise minimal. The spring 275 is operative under these conditions to hold the piston 255 at the upper end of its range of travel with the annular cover flange 236 extending into the piston recess 270.

When the piston 255 is at the upper end of its range of travel, the upper surface 370 of the tubular member 360 is in engagement with the surface 253, and the piston foot 265 is out of engagement with the tubular member 360. The opening 250 and the bore 361 then vent the region below the piston 255 to atmosphere through the cover holes 353. Since the pressure above the piston 255 is minimal, and since this minimal pressure is communicated through the passage 307 to the region above the piston head 292, the piston 290 will be held at the upper end of its range of travel by the spring 305.

When the piston 290 is at the upper end of its range of travel, the gate member 315 extends into the passage 280, as shown in FIG. 2. The presence of the gate member 315 in the passage 280 restricts the rate of flow of air through the passage 280 between the region beneath the piston 255 and the threaded opening 233. The conduit 133 which connects with the threaded opening 233 is, under these circumstances, vented to atmosphere through the passage 280, the chamber 260, the opening 250, the bore 361, and the holes 353.

Normal service brake application of the trailer brake actuators 13 is effected by depressing the foot-operated lever 100. As the lever 100 is depressed, the air pressure in the signal conduit 93 increases, causing a corresponding increase in pressure atop the pistons 255, 290. This pressure increase is not initially sufficient to cause downward movement of the piston 290, but is sufficient to cause downward movement of the piston 255.

As the piston 255 moves downwardly, the piston foot 265 engages the upper surface 370 of the tubular member 360 and closes off the upper end of the bore 361. At this time, the conduit 133, the passage 280, and the region beneath the piston 255 are no longer vented to atmosphere.

As the piston 255 continues to move downwardly under the influence of increasing pressure in the signal conduit 93, the tubular member 360 is depressed, as shown in FIG. 2. When the upper surface 370 of the tubular member 360 no longer engages the surface 253, communication is established between the passages 280, 330 through the opening 250.

As soon as communication is established between the passages 280, 330, pressurized air begins to flow from the conduits 143, 43 into the conduits 133, 33a, causing the relay valve 148 to pressurize the trailer service brake chambers 13a. As the foot-operated lever 100 is depressed further causing a continued increase in pressure in the signal conduit 93, the piston 290 begins to move downwardly. Downward movement of the piston 290 pushes the gate member 315 into the plug bore 311 permitting an increased flow of air through the passage 280 to the relay valve 148. FIG. 3 shows the configuration of the tractor protection valve 130 when the trailer service brakes are fully applied.

The movements of the pistons 255, 290 and the tubular member 360 reverse when the foot-operated lever 100 is released causing a decrease in pressure in the signal conduit 93.

In the event of a failure in the conduits 133, 33a, or in the trailer the connector 134, the tractor protection valve 130 permits a modulated application of the trailer spring brake system, as will now be described. In such circumstances, the pistons 255, 290 and the tubular member 360 will operate just as described above when the foot-operated lever 100 is depressed to control the discharge of air from the conduits 143, 43 and from the spring brake chambers 13b.

When the piston 255 starts to move downwardly in response to signal pressure in the conduit 93, communication is established between the passages 280, 330, as described above. Pressurized air begins to flow from the conduits 143, 43 into the conduits 133, 33a. However, due to the rupture in one of the conduits 133, 33a or in the connector 134, the air supplied to the conduit 133 will escape, and no service brake application of the trailer brake actuators 13 will be effected.

As air is depleted from the conduits 143, 43 the spring brake chambers 13b will begin to be exhausted, and spring brake application of the trailer brake actuators 13 will be initiated. The speed at which the spring brake application of the trailer brake actuators 13 takes place is governed by the piston 290. When the operator depresses the foot-operated lever 100 only slightly to provide a relatively low signal pressure to atop the pistons 255, 290, the piston 290 remains at the upper end of its travel, causing the gate member 315 to substantially restrict the flow of air through the passage 280. When the flow of air through the passage 280 is restricted in this fashion, the pressure drop in the spring brake chambers 13b is insufficient to effect spring brake application.

When the operator depresses the foot-operated lever 100 to a greater degree causing a higher signal pressure to be transmitted to the regions atop the piston 255, 290, the piston 290 begins to move downwardly. Downward movement of the piston 290 moves the gate member 315 inwardly of the plug bore 310, permitting a greater rate of air flow through the passage 280, and causing a sufficient pressure drop in the spring brake chambers 13b to bring the spring brakes into play. Further depression of the foot-operated lever 100 effects a more rapid exhaustion of the spring brake chambers 13b, causing a smooth but rapid spring brake application of the trailer brake actuators 13.

When the operator releases the foot-operated lever 100, thereby causing a reduction in signal pressure applied atop the pistons 255, 290, the pistons 255, 290 reassume their uppermost positions. When the piston 255 assumes its uppermost position, the tubular member 360 closes off communication between the passages 330, 280. As soon as communication is cutoff between the passage 330, 280, the conduits 143, 43 and the spring brake chambers 13b are recharged by air passing through the orifice 203, releasing the spring brake application of the trailer brake actuators 13.

As will be apparent, the tractor protection valve 130 is operative to control both normal service brake application of the trailer brake actuators 13, and to provide a modulated service brake application of the trailer brake actuators 13. During an emergency situation where the trailer service brakes system has failed, the piston 290 and the gate member 315 permit spring brake application of the trailer brake actuator 13 in a controlled fashion. Moreover, as soon as the operator release the foot-operated lever 100, the trailer spring brake system recharges and can be repetitively operated under the control of the foot-operated lever 100.

Figure 4:
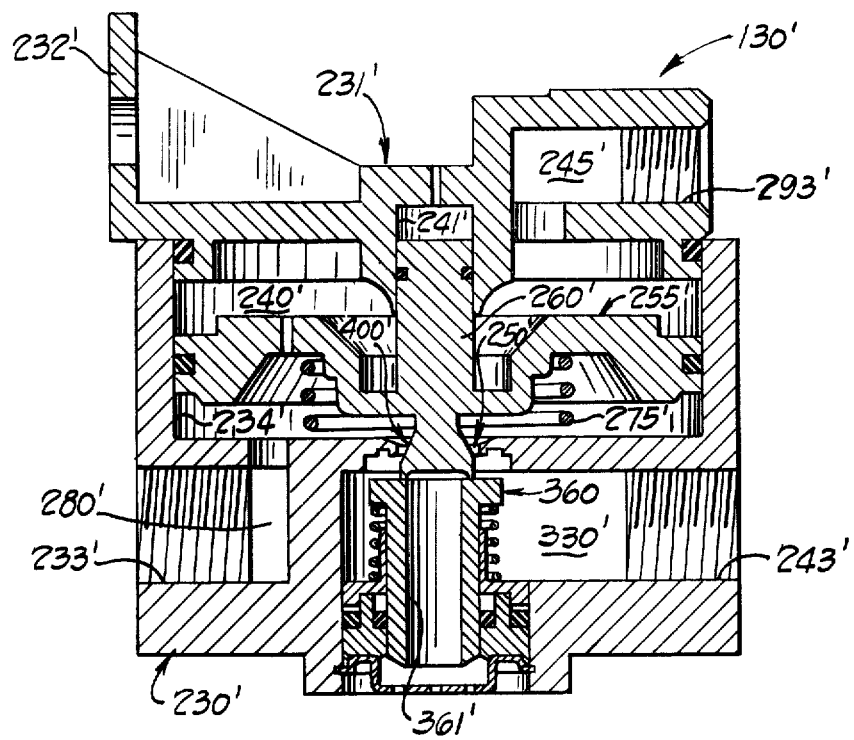
Figure 5:
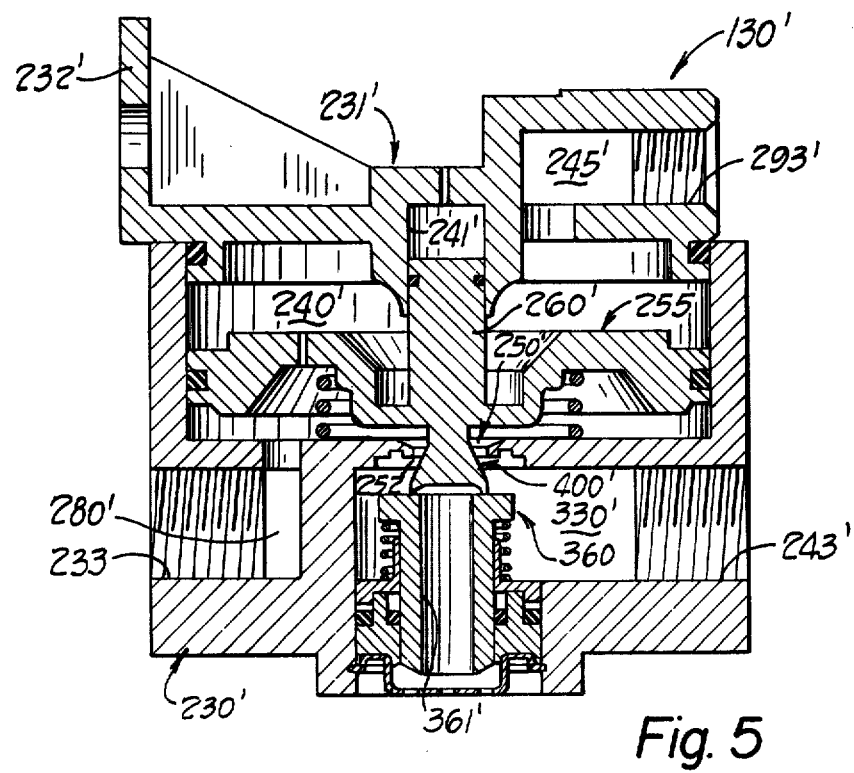

Referring to FIGS. 4 and 5, an alternate embodiment of the tractor protection valve 130' is shown. The valves 130, 130' differ in two ways: First, the piston 290 and the gate member 315 are eliminated in the valve 130'; Second, the piston foot 265' in the valve 130' is configured differently from the piston foot 265 in the valve 130. As will be explained, the piston foot 265' cooperates with the opening 250' to control the rate of flow of air between the passages 330', 280', thereby performing the same function as was achieved with the piston 290 and gate member 315 in the valve 130.

Since all of the components of the valve 130' correspond to the components of the valve 130, the components in the valve 130' have been given primed numerals which correspond to the numerals applied to the components of the valve 130.

Referring to FIGS. 4 and 5, the piston foot 265' has a tapered transition region 400' between the outer wall 266' and the smaller diameter portion of the piston end region 261'. The tapered region 400' cooperates with the cylindrical wall 252' to provide a restricted opening between the passages 280', 330' which varies in size depending upon the magnitude of the signal pressure applied atop the piston 255'. When the signal pressure atop the piston 255' is relatively low, the opening between the tapered region 400' and the wall 252' is relatively small as shown in FIG. 4, permitting only a low flow rate of air from the passage 330' into the passage 280'. As signal pressure atop the piston 250' increases, the space between the tapered region 400' and the wall 252' increases in size as shown in FIG. 5, permitting a faster flow rate of air to be exhausted from the conduits 143, 43. As will be apparent, the tapered piston foot 265' accordingly effects the same type flow control as is accomplished by the piston 290 and the gate member 315 in the valve 130.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A vehicle brake comprising:
   a. a service brake sub-system operable when pressurized above a predetermined pressure to effect brake application;
   b. an emergency brake sub-system operable when depressurized below a certain pressure to effect brake application;
   c. a source of pressurized fluid;
   d. flow restriction means communicating said source and said emergency brake sub-system for limiting the rate of flow of pressurized fluid from said source to said emergency brake sub-system;
   e. valve means including a valve communicating with said emergency brake sub-system and being operative to transfer pressurized fluid out of said emergency brake sub-system to effect an application of said service brake sub-system when said service brake sub-system is operational, and to effect an application of said emergency brake sub-system if said service brake sub-system has failed.

2. A vehicle brake system comprising:
   a. a service brake sub-system;
   b. an emergency brake sub-system;
   c. a source of pressurized fluid;
   d. flow restriction means communicating said source and said emergency brake sub-system for limiting the rate of flow of pressurized fluid from said source to said emergency brake sub-system;
   e. valve means including a valve communicating with said emergency brake sub-system and being operative to transfer pressurized fluid out of said emergency brake sub-system to effect an application of said service brake sub-system when said service brake sub-system is operational, and to effect an application of said emergency brake sub-system if said service brake sub-system has failed; and,
   f. said valve means additionally including:
      i. a signal conduit communicating with said valve to receive pressurized fluid transfered out of said emergency brake sub-system by said valve; and,
      ii. a relay valve connected to said signal conduit and operative in response to pressurization of said signal conduit to effect an application of said service brake sub-system.

3. A vehicle brake system comprising:
a. a service brake sub-system;
b. an emergency brake sub-system;
c. a source of pressurized fluid;
d. flow restriction means communicating said source and said emergency brake sub-system for limiting the rate of flow of pressurized fluid from said source to said emergency brake sub-system;
e. valve means including a valve communicating with said emergency brake sub-system and being operative to transfer pressurized fluid out of said emergency brake sub-system to effect an application of said service brake sub-system when said service brake sub-system is operational, and to effect an application of said emergency brake sub-system if said service brake sub-system has failed;
f. control means operative to provide a variation in a control signal indicative of a desired degree of vehicle brake application; and,
g. said valve means being responsive to said control signal to regulate the flow rate of fluid transferred out of said emergency brake sub-system to achieve the desired degree of brake application.

4. In a brake system of the type including service and emergency brake chambers respectively forming portions of service and emergency brake sub-systems, the improvement comprising:
a. connection means for communicating the emergency brake sub-system with a source of pressurized fluid;
b. valve means operative to selectively establish a controlled flow of pressurized fluid from the emergency brake sub-system;
c. said valve means being operative when the service brake sub-system is operating normally to utilize said controlled flow to effect controlled service brake application;
d. said connection means being operative when the service brake sub-system has failed to limit the rate at which pressurized fluid is supplied from such source to the emergency brake sub-system; and,
e. said valve means being operative when the service brake sub-system has failed to deplete pressurized fluid at a controlled flow rate from the emergency brake sub-system and effect a controlled emergency brake application.

5. The brake system of claim 4 wherein:
a. control means is provided for generating a signal indicative of the desired degree of brake application;
b. said valve means is responsive to such signal to establish a controlled flow of fluid from the emergency brake sub-system that will:
 i. during normal operation of the service brake sub-system, be operative to effect the desired degree of brake application by the service brake sub-system; and,
 ii. during failure of the service brake sub-system, be operative to effect the desired degree of brake application by the emergency brake sub-system.

6. The brake system of claim 5 wherein:
a. said control means includes foot-operated valve means communicating with a source of pressurized fluid, and conduit means interconnecting said foot-operated valve means and said valve means to provide a fluid pressure signal to said valve means indicative of the desired degree of brake application; and, b. said valve means is responsive to said fluid pressure signal to establish a controlled flow of fluid from the emergency brake sub-system that will give the desired degree of brake application.

7. The brake system of claim 6 wherein said valve means includes passage means communicating with the emergency brake sub-system and variable flow restriction means in said passage for controlling the flow rate of fluid passing through said passage.

8. The brake system of claim 7 wherein said flow restriction means includes at least one movable piston which positions itself in response to said fluid pressure signal to vary said flow rate.

9. A vehicle brake system, comprising:
a. a service brake sub-system normally operable when pressurized with fluid above a first predetermined pressure to apply a vehicle braking force;
b. An emergency brake sub-system operable when pressurized with fluid below a second predetermined pressure to apply a vehicle braking force;
c. a source of pressurized fluid having fluid pressurized at a third predetermined pressure that is greater than said first and second predetermined pressured;
d. flow restriction means communicating said source and said emergency brake sub-system for supplying pressurized fluid from said source to said emergency brake sub-system in an effort to maintain, the fluid pressure in said emergency brake sub-system at said third predetermined pressure;
e. valve means communicating with said emergency brake sub-system and being operative to selectively transfer pressurized fluid at a controlled rate of flow from said emergency brake sub-system;
f. said flow restriction means being operable to limit the rate of flow of pressurized fluid from said source to said emergency brake sub-system thereby permitting a drop in fluid pressure in said emergency brake sub-system when said valve means is transferring pressurized fluid from said emergency brake sub-system.

10. The vehicle brake system of claim 9 wherein said valve means is operative to utilize said controlled flow to effect the application of a vehicle braking force by said service brake sub-system when said service brake sub-system is operational.

11. The vehicle brake system of claim 10 wherein said valve means is additionally operable to deplete the pressure in said emergency brake sub-system and effect the application of a vehicle braking force by said emergency brake sub-system when said service brake sub-system has failed.

12. The vehicle brake system of claim 11 wherein said flow restriction means is operable to provide a rate of fluid flow from said source to said emergency brake sub-system that will be insufficient to prevent the fluid pressure in said emergency brake sub-system from dropping below said second predetermined pressure when said valve means is transferring pressurized fluid from said emergency brake sub-system and said service brake sub-system has failed.

13. The vehicle brake system of claim 12 wherein said flow restriction means is operable to re-establish a fluid pressure level within said emergency brake sub-system above said second predetermined pressure after said valve means has:
 i. transferred a sufficient amount of pressurized fluid from said emergency brake sub-system during a condition of service brake system failure to decrease the fluid pressure in said emergency brake sub-system below said second predetermined pressure; and, ii. closed to stop the transfer of pressurized fluid from said emergency brake sub-system.

14. The vehicle brake system of claim 9, wherein:
a. a control means is provided at a vehicle location which is readily accessible to an operator for providing a signal indicative of whether a vehicle brake application force is to be applied; and,
b. said valve means is responsive to said signal to selectively prevent and permit a transfer of fluid out of said emergency brake sub-system.

15. The vehicle brake system of claim 14 wherein:
a. said control means includes a valve structure;
b. said valve structure communicates with said source of pressurized fluid;
c. conduit means interconnects said valve structure and said valve means;
d. said valve structure is operable to transfer pressurized fluid from said source to said conduit means to establish a signal pressure in said conduit means indicative of whether a vehicle brake application force is to be applied; and
e. said valve structure is responsive to said signal pressure to selectively prevent and permit a transfer of fluid out of said emergency brake sub-system to effect the application of a vehicle braking force.

16. The vehicle brake system of claim 15 wherein said valve means includes movable piston means for regulating the transfer of fluid out of said emergency brake sub-system in response to said signal pressure.

17. The vehicle brake system of claim 16 wherein said at least one piston includes first and second pistons, said first piston being operative to prevent and permit a transfer of fluid out of said emergency brake sub-system, and said second piston being operative to regulate the flow rate of fluid transferred out of said emergency brake sub-system.

18. A pneumatic tractor-trailer vehicle brake system, comprising:
a. a service brake sub-system normally operable when pressurized with air above a first predetermined pressure to apply a vehicle braking force;
b. an emergency brake sub-system operable when pressurized with air below a second predetermined pressure to apply a vehicle braking force and rendered inoperable when pressurized with air above said second predetermined pressure;
c. a source of pressurized air, the source when in use and ready for operation having air pressurized at a third predetermined pressure that is greater than each of said first and second predetermined pressures;
d. flow restriction means communicating said source and said emergency brake sub-system for supplying pressurized air from said source to said emergency brake sub-system to maintain the air pressure in said emergency brake sub-system at said third predetermined pressure;
e. valve means communicating with said emergency brake sub-system for selectively transferring pressurized air at a controlled rate out of said emergency brake sub-system;
f. said valve means being operative to utilize said controlled flow to effect the application of a vehicle braking force by said service brake sub-system when said service brake sub-system is operational; and,
g. said valve means additionally being operative to deplete the pressure in said emergency brake sub-system and effect the application of a vehicle braking force by said emergency brake sub-system when said service brake sub-system has failed.

19. The vehicle brake system of claim 18, wherein:
a. said control means includes a valve structure;
b. said valve structure communicates with said source of pressurized air;
c. conduit means interconnects said valve structure and said valve means;
d. said valve structure is operable to transfer pressurized air from said source to said conduit means to establish a signal pressure in said conduit means indicative of whether a vehicle brake application force is to be applied; and,
e. said valve means is responsive to said signal pressure to selectively prevent and permit a transfer of air out of said emergency brake sub-system to effect the application of a vehicle braking force.

20. The vehicle brake system of claim 19 wherein said valve means includes:
a. a housing structure defining a chamber;
b. a first passage communicating with said chamber for transmitting said signal pressure to said chamber;
c. a second pressure defining a path of flow for the transfer of air through said valve means out of said emergency brake sub-system;
d. piston means movably mounted in said chamber for movement in response to variations in said pressure signal to regulate the rate of flow of air through said second passage.

21. The vehicle brake system of claim 20 wherein said piston means includes first and second pistons movably carried in said housing, said first piston being operative to selectively establish communication between said second passage and said emergency brake sub-system, and said second piston being extensible into said second passage to regulate the rate of flow of air through said second passage.

22. The system of claim 1 wherein said flow restriction means and said valve means cooperate to effect a reduction in fluid pressure in said emergency brake sub-system during at least a portion of the time when said service brake sub-system is being pressurized to effect brake application of the service brake system.

23. A vehicle brake system, comprising:
a. a service brake sub-system operable when pressurized above a predetermined pressure to effect brake application;
b. an emergency brake sub-system operable when depressurized below a certain pressure to effect brake application;
c. a source of pressurized fluid;
d. control means operable to:
i. selectively pressurize said emergency brake sub-system to a first pressure greater than said certain pressure to release brake application of the emergency brake sub-system;
ii. selectively pressurize said service brake sub-system to effect brake application of said service brake sub-system; and
iii. reduce the pressure whithin said emergency brake sub-system to a second pressure intermediate said certain pressure and said first pressure, concurrently with the application of pressurization of the service brake sub-system.

24. The vehicle brake system of claim 23 wherein said control means includes a valve communicating with said emergency brake sub-system and being operative to transfer pressurized fluid out of said emergency brake sub-system to effect an application of said service brake sub-system when said service brake sub-system is operational, and to effect an application of said emergency brake sub-system if said service brake sub-system has failed.

25. A vehicle brake system, comprising:
   a. at least one service brake actuator normally operable when pressurized to effect service brake application;
   b. at least one emergency brake actuator operable when pressurized above a predetermined pressure to release emergency brake application and operable when depressurized below said predetermined pressure to effect emergency brake application; and
   c. pressurization means for normally maintaining fluid pressure in said emergency brake actuator at a normal pressure above said predetermined pressure; and
   d. means for diminishing the pressure in said emergency brake actuator when said service brake actuator is being pressurized to effect service brake application.

26. The vehicle brake system of claim 25 wherein said pressurization means includes transfer means for transferring at least a portion of the fluid normally used to pressurize said emergency brake actuator at said normal pressure to said service brake actuator when said service brake actuator is being pressurized to effect service brake application.

27. In a brake system of the type including service and emergency brake chambers respectively forming portions of service and emergency brake sub-systems, the improvement comprising:
   a. connection means for communicating the emergency brake sub-system with a source of pressurized fluid;
   b. valve means operative to selectively establish a controlled flow of pressurized fluid from the emergency brake sub-system;
   c. said valve means being operative when the service brake sub-system is operating normally to utilize said controlled flow to effect controlled service brake application; and,
   d. said valve means being operative when the service brake sub-system has failed to deplete pressurized fluid from the emergency brake sub-system to effect emergency brake application.

28. The brake system of claim 27 wherein control means is provided for generating a signal indicative to the desired degree of brake application, and said valve means is responsive to such signal to establish a controlled flow of fluid from the emergency brake sub-system that will, during normal operation of the service brake sub-system, be operative to effect the desired degree of brake application by the service brake sub-system.

29. In a highway vehicle, a brake system comprising:
   a. a service brake sub-system;
   b. an emergency brake sub-system;
   c. the emergency brake sub-system including operating means normally biasing emergency brakes toward and applied condition, and release means operable to apply certain forces opposing the operation of the operating means to render the operating means in effectual; and,
   d. interconnection means responsive to attempted actuation of the service brake sub-system to diminish the certain forces applied by the release means.

* * * * *